April 16, 1968  S. O. Z. M. RAFIQUE ET AL  3,378,318

LUBRICATION OF PLAIN OSCILLATING BEARINGS

Filed Nov. 19, 1965  4 Sheets-Sheet 1

INVENTORS
SYED O. Z. M. RAFIQUE
JOSEPH D. SHULDHAM DE GUERIN

BY Pierce, Scheffler & Parker
ATTORNEYS

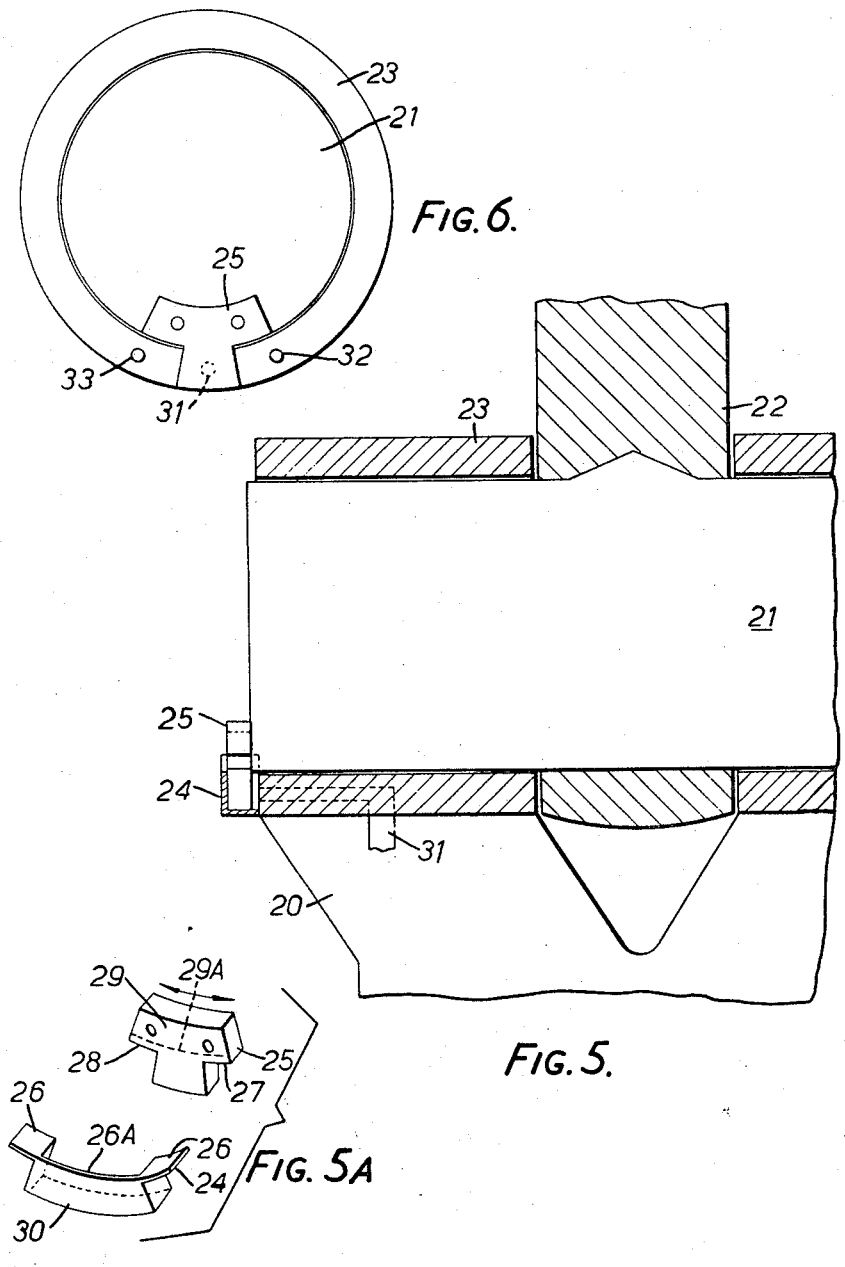

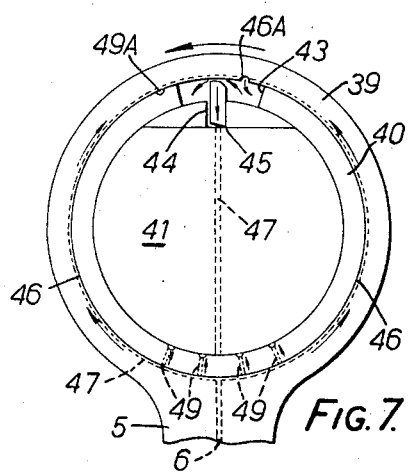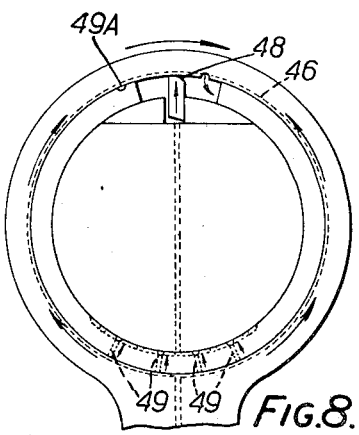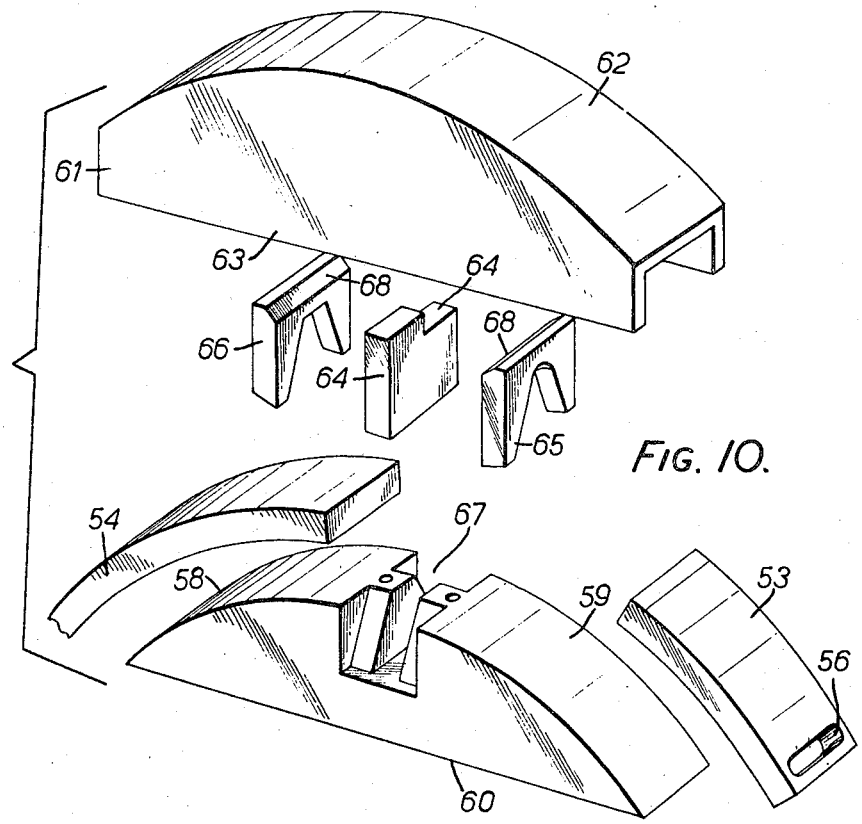

United States Patent Office 3,378,318
Patented Apr. 16, 1968

3,378,318
LUBRICATION OF PLAIN OSCILLATING
BEARINGS
Syed Omar Zikria Mubarak Rafique, Pinner, and Joseph
Dudley Shuldham de Guerin, Whitton, England, assignors to The Glacier Metal Company Limited, Wembley, England, a company of Great Britain
Filed Nov. 19, 1965, Ser. No. 508,782
Claims priority, application Great Britain, Nov. 20, 1964, 47,426/64
13 Claims. (Cl. 308—78)

ABSTRACT OF THE DISCLOSURE

A bearing assembly connecting relatively oscillating parts in which one part is formed with an arcuate recess across which extends a projection constituting a displacement member carried by the other part to provide an oscillating vane type pump delivering oil to the bearing surfaces.

---

Figure 1:
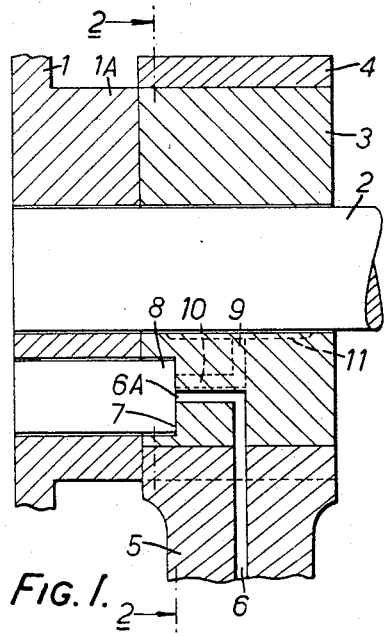

This invention relates to the lubrication of plain bearings by which two members are pivotally connected and in which the two members have relative oscillating movement about the bearing axis. The invention is particularly concerned with such bearings which are subject to heavy cyclically fluctuating loads, for example cross head bearings, the gudgeon pin bearings of reciprocating internal combustion engines, or wrist pin bearings. For convenience herein such bearings will be referred to as bearings of the type referred to. In assemblies incorporating such bearings and more particularly in reciprocating internal combustion engines operating on the two-stroke cycle the load tends often to be always in the same direction although varying cyclically in value and it thus becomes difficult adequately to lubricate the continuously loaded area of the bearing. The problem is not so severe in the case of engines operating on the four-stroke cycle but in this case it is often difficult adequately to maintain the satisfactory oil film on the area of the bearing surface subject to the principal load.

It has been proposed in connection with the lubrication of cross head bearings to provide a reciprocating pump, the piston and cylinder of which are connected respectively to the two parts of the assembly which oscillate relatively to one another so that the pump delivers lubricating oil to the oscillating bearing over some predetermined period of the load cycle. It is also known to supply lubricating oil in relatively small quantities but at relatively high pressures to bearings of the oscillating type from a suitable lubricating pump. These arrangements however are comparatively complicated and it is an object of the present invention to provide in a very simple manner means by which lubricating oil can be delivered under pressure to a bearing of the type referred to without the necessity for providing a separate reciprocating lubricating pump for this purpose.

The invention may be used instead of or supplementary to some conventional lubricating arrangements such, for example as splash lubricating arrangements or arrangements in which lubricating oil is fed through a passage or passages in one of the members between which relative oscillating movement takes place, to the bearing surface.

In an assembly according to the present invention comprising two members connected by a plain bearing for oscillating movement relatively to one another, such two members are formed to provide directly between them at least one chamber the volumetric capacity of which varies as the result of said oscillating movement, said chamber constituting the working chamber of a pump device arranged to deliver lubricating oil to the bearing surfaces of said bearing.

Conveniently in construction according to the invention the working chamber or each working chamber of the pump device is formed between the end of an arcuate recess in one of the two members which oscillate relatively to one another and a projection on the other of said members projecting into said recess. In such constructions the recess may be formed in a circumferential surface of one of the two relatively oscillating members into which a projection from the adjacent circumferential surface of the other of said members projects or the recess may be formed in a flat surface of one of the two members which oscillate relatively to one another, such surface lying in a plane at right angles to the axis of oscillation while the projection projects from an adjacent flat surface on the other of said members.

In either of the above cases a working chamber may be formed at each end of the arcuate recess between such end and the adjacent face of the projection.

The arrangements for the supply of oil to the working chamber or each working chamber and for the delivery of oil from the working chamber or each working chamber to the bearing surfaces may comprise, in addition to a delivery passage leading from the working chamber or each working chamber to the bearing surfaces, an inlet passage for the entry of oil into the working chamber formed in the wall of the working chamber at a point where it will be uncovered at a point in the relative oscillating movement approaching the end of the movement in the direction to increase the volumetric capacity of the working chamber so that the oil will be drawn in by the depression which will then exist in the working chamber, and will subsequently be delivered to the bearing surfaces, after the inlet passage has been closed during the following movement in the opposite direction.

Arrangements not requiring mechanically operated valves may be provided.

Moreover in an arrangement such as that referred to above and in which a projection divides a recess into two working chambers the inlet passage may be common to both working chambers, that is to say the projection may uncover the inlet passage to bring it into communication with the two working chambers respectively towards the ends of its oscillating movement in the two directions.

It will be apparent that the invention will be applied, for example, to a gudgeon pin bearing, i.e. a bearing between a gudgeon pin and a boss in the piston within which the gudgeon pin oscillates during operation, or between a gudgeon pin and a bearing in the adjacent end of a connecting rod, the arrangement in the first instance being of the kind in which the gudgeon pin is rigidly secured to the connecting rod, and in the second case of the kind in which the gudgeon is held stationary with regard to the piston and the connecting rod bearing oscillates thereon.

If desired, there may be two or more recesses co-operating with two or more projections to provide working chambers between the relatively oscillating parts in the manner indicated, whether the recesses are formed in circumferential surfaces or flat surfaces. For example, two such recesses might be formed in flat surfaces adjacent to opposite ends of a bearing to be supplied with lubricant or adjacent to the two gudgeon pin bosses of a piston within which the gudgeon pin oscillates during operation.

It will be realised that the recess may be in either of the two relatively oscillating parts and the projection on the other of such parts, whether the recess is formed in a cylindrical surface or a flat surface as described.

The arrangement may be such that fluid can flow past the projection readily in one direction but not in the other so that the projection draws fluid into the recess on movement of said members in one direction and delivers the fluid under pressure to the bearing surfaces on relative movement of said members in the other direction. In this case the projection preferably includes means acting as non return valves situated between an inlet passage and the chambers respectively on each side of the projections so that the projection draws fluid into one of said chambers and delivers fluid under pressure from the other during said relative movement in each direction. In one arrangement the projection may comprise a member movable radially in a radially extending recess and formed so as to be movable by the differential fluid pressure created during relative movement in one direction into a position in which it prevents flow past it and movable by differential pressure created during relative movement in the other direction into a position in which it permits flow past it. Where the assembly comprises means acting as a non-return valve these means conveniently comprise two members mounted to slide in circumferentially spaced radial slots between which the inlet passage is situated each member being formed and arranged to be moved radially by the fluid pressure acting thereon so as to occupy a position permitting flow past it during the expansion period of the adjacent end of the working chamber and to occupy a position preventing such flow during the contraction period of such adjacent end of the working chamber.

Figure 2:
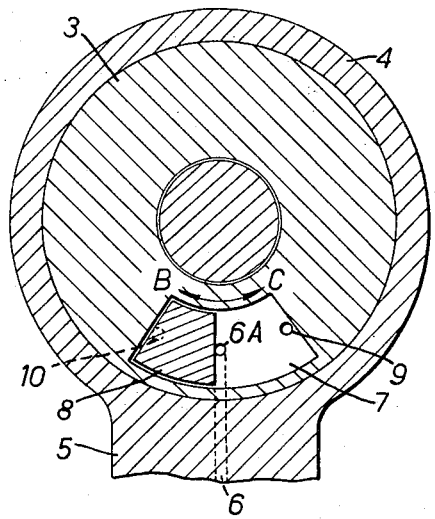
Figure 3:
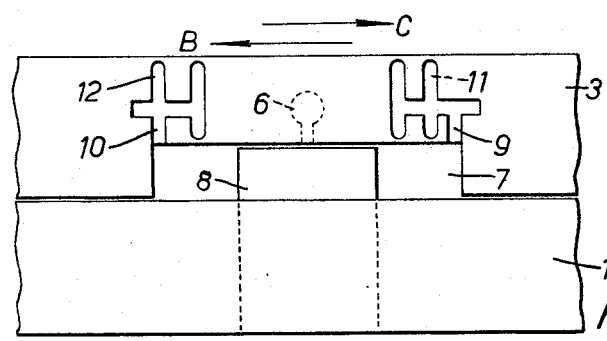
Figure 4:
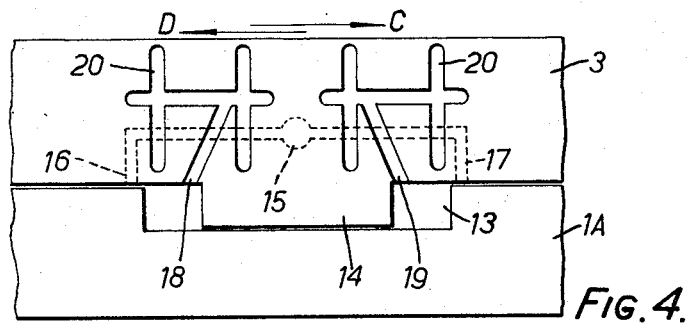

Various forms of the invention will now be described by way of example with reference to the accompanying drawings, in which:

FIGURE 1 is a cross-section in a plane containing the axis of a bearing to which one form of the invention is applied, FIGURE 2 is a cross-section in the plane indicated by the line 2—2 of FIGURE 1, FIGURE 3 is a somewhat diagrammatic developed view of the parts of the arrangement shown in FIGURE 1 and 2 which performs the pumping action, other parts being omitted, FIGURE 4 is a similar view to FIGURE 3 of a modification, FIGURE 5 is a similar view to FIGURE 1 of a further form of the invention, FIGURE 5A shows certain parts of the construction shown in FIGURE 5 in more detail, FIGURE 6 is a front view of part of the arrangement shown in FIGURE 5, FIGURE 7 is a cross-section in a plane at right angles to the axis of the bearing of a further form of the invention with the parts in the position they occupy during the return stroke, FIGURE 8 is a similar view to FIGURE 7 with the parts in the positions they occupy during the pumping stroke.

Figure 9:
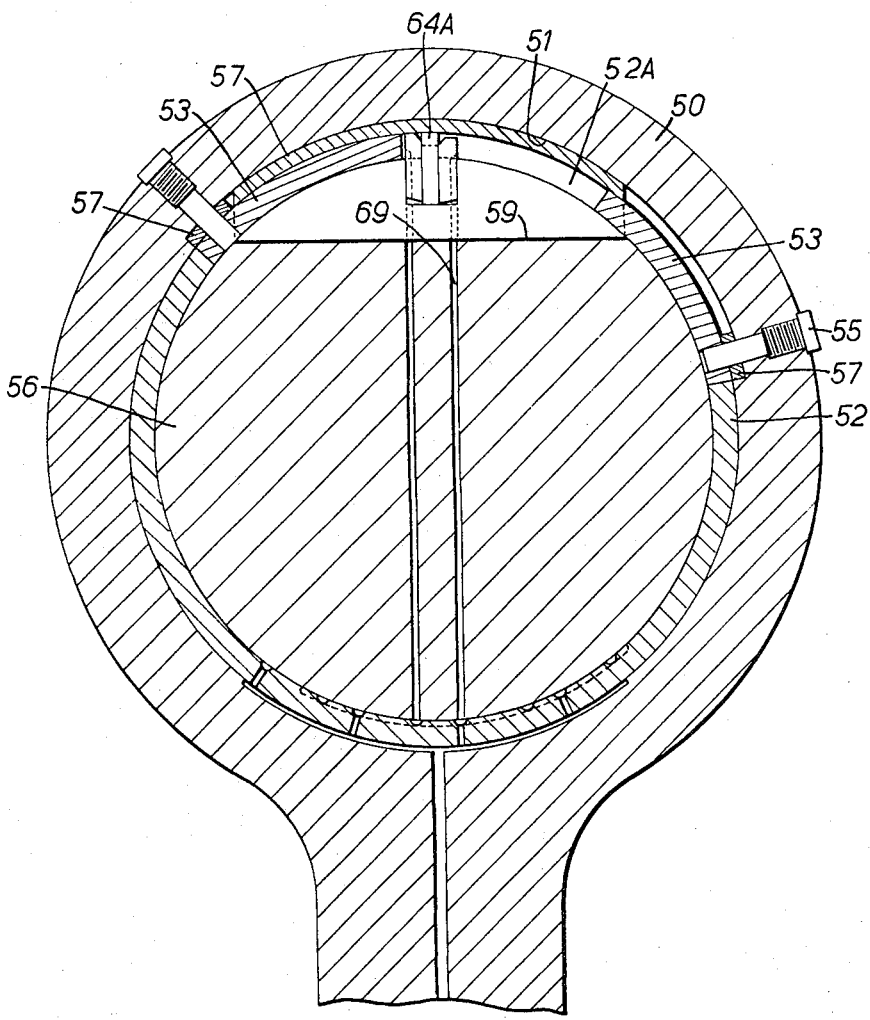

FIGURE 9 is a similar view to FIGURE 7 but only partly in cross section of a further modification of the invention, and FIGURE 10 is an exploded perspective view of and assembly constituting part of the construction shown in FIGURE 9.

In the construction shown in FIGURE 1, 2 and 3, the reference numeral 1 indicates the part of a piston adjacent to one gudgeon pin boss 1A which is thus arranged to receive one end of a gudgeon pin 2, the other gudgeon pin boss, which receives the other end of the gudgeon pin not being shown. The gudgeon pin is held from rotation in the gudgeon pin bosses as by being for example a force fit therein, and the reference numeral 3 indicates a small end bearing surrounding the centre part of the gudgeon pin and secured within the eye 4 at the little end of a connecting rod 5, all in conventional manner. For convenience in illustrating the invention the bearing 3 is shown as having a large external diameter as compared with the diameter of the gudgeon pin 2. An oil supply passage 6 is provided in the connecting rod so as to be fed with oil, for example from a supply passage in the crankshaft, to which the connecting rod 5 is coupled, and this passage communicates through a passage 6A in the body of the bearing 3 with the base of an arcuate recess 7 formed in one end face of the bearing 3. Secured to the gudgeon pin boss 1A is a projection 8 which projects into the recess 7 and is shaped so as to make a good working fit with the base and the arcuate walls of that recess and thus divide the recess 7 into two working chambers.

Leading from the two ends of the recess 7 respectively are oil delivery passages 9 and 10 which as shown in FIGURE 3 communicate with oil distributing grooves 11 and 12 in the surface of the bore of the bearing 3.

In operation as the connecting rod 5 eye 4 and little end bearing 3 oscillate about the gudgeon pin relatively to the boss 1A as indicated by the arrows B and C in FIGURE 2 the recess 7 will travel back and forth relatively to the projection 8 between the position shown in FIGURE 2 wherein the projection lies at one end of the recess and the position in which the projection lies at the other end of the recess such travel representing for example a range of oscillating movement of say 30° i.e. 15° on each side of a central position. The projection thus acts as a double acting pump by which, towards each end of its movement relatively to the recess, when it uncovers the passage 6A oil is drawn from the passages 6A and 6 into the working chamber which is then at its largest volume and subsequently by the return movement of the projection after the passage 6A has been closed is forced from such working chamber through the passage 9 or 10 as the case may be into the appropriate oil distributing grooves 11 or 12.

In the modification indicated in FIGURE 4 in which the gudgeon pin boss 1A and the bearing 3 are identified by the same references as in FIGURE 3, the bearing 3 is provided with a projection 14 projecting into and arranged for oscillating movement in an arcuate recess 13 in the gudgeon pin boss 1A in the same general manner as relative oscillating movement takes place between the projection 8 and recess 7 in the FIGURES 1, 2 and 3. In the arrangement shown in FIGURE 4 an oil supply passage 15, which may be regarded as the equivalent of the oil supply passage 6 in FIGURES 1 to 3, branches into two supply passages 16 and 17 disposed as shown so that each comes into communication with the adjacent end of the recess at a point in the travel of the projection 15 in the recess away from that end. Moreover passages 18 and 19 extend from points closely adjacent to opposite sides of the projection 14 into oil distributing grooves 20 in the bore of the bearing 3. Thus in operation during movement of the projection 14 in each direction in the recess 13 it draws oil into one end of the recess through the passage 16 or 17 as the case may be and forces oil from the other end of the recess through the passage 19 or 18.

In the construction shown in FIGURES 5, 6 and 7 the invention is applied to a cross head bearing wherein the part 20 is the forked end of a connecting rod having bearing eyes 23 in which are mounted the ends of a cross head journal 21 by which the connecting rod is coupled to a reciprocating piston rod 22 to which the centre part of the journal is secured. The bearing eye 23 carries at its outer end a trough like member 24 which constitutes an arcuate recess into which projects a projection 25 rigid with the journal 21.

The general form of the trough member 24 and of the projection 25 are shown in FIGURE 5A from which, in conjunction with FIGURE 6 it will be seen that the trough member has flanges 26 which slide on faces 27 and 28 of extension parts integral with the projection while the face 29 of the projection slides on the inner surface or the wall 30 of the trough member. The extension parts which have the faces 27 and 28 fit within the trough member up to the dotted line 29A, to which end the faces 26 lie a little below the face of the edge 26A of the trough member.

Suitable supply and delivery passages will be arranged to communicate respectively with the recess and the bearing surfaces to be supplied with lubricant, these passages opening into the recess at appropriate points, for example 31 may represent a supply passage and 32 and 33 delivery passages.

In the construction shown in FIGURE 7 the arrangement of the gudgeon pin in the piston is to be assumed to be generally similar to that shown in FIGURE 1 and will not, therefore, again be described. In FIGURE 7 the small end 39 of the connecting rod 5 has secured therein a bearing 40 through which extends the gudgeon pin 41 relatively to which it oscillates with the small end in conventional manner during operation. A circumferentially extending recess 43 is formed in the upper part of the bearing 40, into which recess opens the outer end of a radially extending slot 44 formed in the gudgeon pin or a part rigid with it.

Arranged partly within the slot 44 and partly in the recess 43 is a combined piston and valve member 45 the operation of which is hereinafter more fully explained. The member 45 is of generally rectangular form in cross-section as shown, but its base is inclined at a small angle to the base of the slot 44 while its upper end is chamfered on the righthand side as shown at 48. Oil supply passages 46 open into the recess 43 at 46A, while an oil delivery passage 47 leads from a point adjacent to the righthand side of the base of the slot 44 to a point in the heavily loaded area of the bearing surface between the bearing 40 and the gudgeon pin. The oil passages 46 are formed by grooves in the outside of the bearing 40 the upper ends of which communicate with the recess 43 at the point 46A while their lower ends communicate with the oil passage 6 in the connecting rod 5. Further oil supply passages 49 are provided to supply oil to the region of greatest load from the groove 46 as indicated.

In operation the connecting rod 5 oscillates with respect to the gudgeon pin 41 and the bearing 40 moves in the anticlockwise direction the oil present in the righthand end of the slot 43 is transferred over the top of the member 45 into the lefthand end of the slot 45 as shown in FIGURE 7, whereas as the bearing 40 moves in the clockwise direction the oil in the lefthand end of the slot 43 is put under pressure and, as shown in FIGURE 8, this pressure acts upon the base of the member 45 to force this member upwards against the upper side of the recess 43. The oil is thus force from the lefthand end of the recess 43 down the lefthand side of the slot 44 and thence through the passage 47.

It will be understood that the presence of the chamfer 48 and the inclined form of the inner end of the member 45 provide the required differential pressure areas to ensure the above operation. An oil pressure relife groove 49 is provided at the point indicated.

The general action of the construction shown in FIGURES 9 and 10 is somewhat similar to that shown in FIGURES 7 and 8. In the construction shown in FIGURES 9 and 10 the small end 50 of the connecting rod has an arcuate recess 51 formed therein and a bearing member 52 secured thereto, this bearing member having a corresponding circumferentially coextensive arcuate slot 52A formed therein, secured to the small end and abutting against the ends of the slot 52A are part cylindrical members 53, 54 of the same inner and outer radii as the bearing member. The members 53, 54 are secured to the small end by screws 55 extending into slots 56 in their upper surfaces which allow for sideways movement to take up end float, but do not permit circumferential movement, while radial movement is prevented by distance pieces 57. Secured to the gudgeon pin 56, which is itself held from rotation in the piston, in a recess therein is an assembly comprising an inner member 58 which has a part-cylindrical outer surface 59 and a flat inner face 60 which engages a corresponding flat face on the gudgeon pin. The assembly also includes an outer channel-like member 61 the base 62 of which lies and moves in the recess 51 while its sides 63 lie in close sliding engagement with the sides of the member 51, and a valve assembly comprising a central member 64 and two side members 65, 66, all located partially in a radial slot 67, in the member 58 and extending across the arcuate slot 52A. The member 64 extends between the base of the slot in the member 58 and the inner surface of the base 62 of the member 61, while the members 65 and 66 are of the shapes shown in FIGURE 10 and include chamfers 68 as indicated.

Formed in the gudgeon pin and the part 58 are oil delivery pasages 69 extending from the base of the slot to points of delivery at the bearing surface between the bearing and the gudgeon pin, while there is formed in the member 64 an inlet groove 64A which communicates through the base 62 of the member 61 with an oil supply pasage in the form of a groove in the small end (not shown).

The operation is as follows. As the small end moves anticlockwise, oil is drawn into the righthand end of the slot 52A through the inlet slot 64A while oil previously drawn into the lefthand end of the slot 52A is delivered by way of a passage then uncovered by the member 65 to the appropriate one of the delivery passages 69 in the gudgeon pin. During clockwise movement of the small end the reverse action takes place, that is to say the oil previously drawn into the righthand end of the slot 52A acts through on the member 65 to force this member outwards into engagement with the inner surface of the base 62 of the member 61, so that the oil is then forced down the passage uncovered by the member 66 into the other of the two delivery passages 69 in the gudgeon pin, oil being simultaneously drawn into the lefthand end of the slot from the inlet shlot 64A in the member 64.

It will be apparent that the chamfers on the members 65 and 66 and the inclined form of the inner ends of these members perform a similar function to the corresponding formations on the member 45 in the construction shown in FIGURES 7 and 8.

What we claim as our invention and desire to secure by Letters Patent is:

1. A bearing assembly comprising two members pivotally connected by a plain bearing for relative oscillating movement, one of said two members having formed therein an arcuate recess constituting the working chamber of a pumping device, a projection arranged to move with the other member and extending across the recess to constitute the displacement member of said pumping device whereby the volumetric capacities of the parts of said chamber lying on opposite sides of said projection vary as a result of said relative oscillating movement, said chamber having at least one inlet port communicating with a source of lubricating liquid and at least one outlet port communicating with the working clearance of the said plain bearing whereby the said pumping device draws lubricating liquid from said source and delivers said lubricating liquid to said working clearance under pressure by reason of said oscillating movement.

2. A bearing assembly as claimed in claim 1 in which said recess is formed in a circumferential surface of the said one of the two relatively oscillating members and said projection projects from the adjacent circumferential surface of the other of said two members.

3. A bearing assembly as claimed in claim 2 in which said recess is formed in a flat surface of the said one of said two relatively oscillating members, such surface lying in a plane at right angles to the axis of oscillation while the projection projects from an adjacent flat surface on the other of said relatively oscillating members.

4. A bearing assembly as claimed in claim 1 wherein a delivery port communicates with the part of said recess on each side of said projection while a common inlet port is disposed in said recess in a position in which it will be uncovered by said projection towards the end of the oscillating movement of said projection relatively to said recess in each direction.

5. A bearing assembly as claimed in claim 1 wherein said inlet port is disposed at a position in said recess such that it is brought by movement of the projection into communication with the working chamber towards the end of the movement of said projection in said recess during which the volumetric capacity of the working chamber is being increased.

6. A bearing assembly as claimed in claim 4 wherein said projection comprises two circumferentially spaced parts, said inlet port lies between said parts and a delivery port communicates with the part of the recess lying on each side of said projection.

7. A bearing assembly as claimed in claim 1 in which a working chamber is formed at each end of the arcuate recess between such end and the adjacent face of the projection.

8. A bearing assembly as claimed in claim 1 in which the arrangements for the supply of oil to the working chamber or each working chamber and for the delivery of oil from the working chamber or each working chamber to the bearing surfaces comprises, in addition to a delivery passage leading from the working chamber or each working chamber to the bearing surfaces, an inlet passage for the entry of oil into the working chamber formed in the wall of the working chamber at a point where it will be uncovered at a point in the relative oscillating movement approaching the end of the movement in the direction to increase the volumetric capacity of the working chamber so that the oil will be drawn in by the depression which will then exist in the working chamber, and will subsequently be delivered to the bearing surfaces, after the inlet passage has been closed during the following movement in the opposite direction.

9. A bearing assembly as claimed in claim 8 in which the projection divides a recess into two working chambers and the inlet passage is common to both working chambers.

10. A bearing assembly as claimed in claim 1 in which the arrangement is such that fluid can flow past the projection readily in one direction but not in the other so that the projection draws fluid into the recess on relative movement of said members in one direction and delivers the fluid under pressure to the bearing surfaces on relative movement of said members in the other direction.

11. A bearing assembly as claimed in claim 10 in which the projection includes means acting as non-return valves situated between an inlet passage and the chambers respectively on each side of the projections so that the projection draws fluid into one of said chambers and delivers fluid under pressure from the other during said relative movement in each direction.

12. A bearing assembly as claimed in claim 11 in which the means acting as non-return valve comprises two members mounted to slide in circumferentially spaced radial slots between which the inlet passage is situated each member being formed and arranged to be moved radially by the fluid pressure acting thereon so as to occupy a position permitting flow past it during the expansion period of the adjacent end of the working chamber and to occupy a position preventing such flow during the contraction period of such adjacent end of the working chamber.

13. A bearing assembly as claimed in claim 10 in which said projection comprises a member movable radially in a radially extending recess and formed so as to be movable by the differential fluid pressure created during relative movement in one direction into a position in which it prevents flow past it and movable by differential pressure created during relative movement in the other direction into a position in which it permits flow past it.

References Cited

UNITED STATES PATENTS 2,629,639   2/1952   Johansen _____ 308—78

MARTIN P. SCHWADRON, *Primary Examiner.*

FRANK SUSKO, *Examiner.*